United States Patent
Yokoyama et al.

(10) Patent No.: US 10,784,534 B2
(45) Date of Patent: Sep. 22, 2020

(54) SOLID ELECTROLYTE AND LITHIUM ION BATTERY

(71) Applicant: SEIKO EPSON CORPORATION, Tokyo (JP)

(72) Inventors: Tomofumi Yokoyama, Matsumoto (JP); Hitoshi Yamamoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 58 days.

(21) Appl. No.: 16/085,957

(22) PCT Filed: Mar. 10, 2017

(86) PCT No.: PCT/JP2017/009778
§ 371 (c)(1),
(2) Date: Sep. 17, 2018

(87) PCT Pub. No.: WO2017/159571
PCT Pub. Date: Sep. 21, 2017

(65) Prior Publication Data
US 2019/0097267 A1    Mar. 28, 2019

(30) Foreign Application Priority Data
Mar. 18, 2016 (JP) ................. 2016-054951

(51) Int. Cl.
*H01M 10/0562* (2010.01)
*H01M 10/0585* (2010.01)
(Continued)

(52) U.S. Cl.
CPC ...... *H01M 10/0562* (2013.01); *C01G 33/006* (2013.01); *C01G 35/006* (2013.01);
(Continued)

(58) Field of Classification Search
CPC .................................. H01M 10/0562
See application file for complete search history.

(56) References Cited

U.S. PATENT DOCUMENTS 10,347,937 B2 * 7/2019 Beck ................ H01M 10/0585
2009/0246634 A1   10/2009 Shiozaki et al.
(Continued)

FOREIGN PATENT DOCUMENTS

JP    2003-346895 A    12/2003
JP    2009-215130 A     9/2009
(Continued)

OTHER PUBLICATIONS

Machine Translation of WO2014038521A1 (Dec. 12, 2019) (Year: 2019).*

(Continued)

*Primary Examiner* — Matthew J Merkling
(74) *Attorney, Agent, or Firm* — Oliff PLC

(57) ABSTRACT

A solid electrolyte capable of securing grain boundary resistance even when firing is performed at a relatively low temperature and a battery using the solid electrolyte are provided. The solid electrolyte includes a first electrolyte which contains a lithium composite metal compound, and a second electrolyte which contains Li and at least two kinds of metal elements selected from group 5 elements in period 5 or higher or group 15 elements in period 5 or higher.

6 Claims, 5 Drawing Sheets

(51) Int. Cl.

| | | |
|---|---|---|
| *C01G 33/00* | (2006.01) | |
| *C04B 35/50* | (2006.01) | |
| *C04B 35/64* | (2006.01) | |
| *C04B 35/01* | (2006.01) | |
| *C01G 35/00* | (2006.01) | |
| *C04B 35/486* | (2006.01) | |
| *H01B 1/08* | (2006.01) | |
| *H01M 10/0525* | (2010.01) | |

(52) U.S. Cl.
CPC ............ *C04B 35/01* (2013.01); *C04B 35/486* (2013.01); *C04B 35/50* (2013.01); *C04B 35/64* (2013.01); *H01B 1/08* (2013.01); *H01M 10/0525* (2013.01); *H01M 10/0585* (2013.01); *C01P 2002/30* (2013.01); *C01P 2002/72* (2013.01); *C01P 2006/40* (2013.01); *C04B 2235/3203* (2013.01); *C04B 2235/3227* (2013.01); *C04B 2235/3244* (2013.01); *C04B 2235/3294* (2013.01); *C04B 2235/3409* (2013.01); *C04B 2235/441* (2013.01); *C04B 2235/604* (2013.01); *C04B 2235/764* (2013.01); *C04B 2235/77* (2013.01); *C04B 2235/80* (2013.01); *C04B 2235/81* (2013.01); *H01M 2300/0068* (2013.01); *H01M 2300/0077* (2013.01); *H01M 2300/0091* (2013.01)

(56) References Cited

U.S. PATENT DOCUMENTS

| | | |
|---|---|---|
| 2011/0059369 A1 | 3/2011 | Nan et al. |
| 2015/0118573 A1 | 4/2015 | Yokoyama et al. |
| 2016/0093915 A1 | 3/2016 | Yamamoto et al. |
| 2016/0104891 A1* | 4/2016 | Holme .................. H01M 4/13 429/303 |
| 2016/0133990 A1* | 5/2016 | Schwanz ........... H01M 10/0525 429/403 |
| 2016/0329539 A1* | 11/2016 | Kawaji .................. H01M 4/13 |
| 2017/0179521 A1* | 6/2017 | Sakamoto ........... H01M 4/0471 |
| 2018/0062200 A1* | 3/2018 | Yamamoto ........ H01M 10/0525 |
| 2018/0175446 A1* | 6/2018 | Nishizaki ........... H01M 10/0562 |
| 2019/0214674 A1* | 7/2019 | Lim .................... H01M 10/058 |

FOREIGN PATENT DOCUMENTS

| | | | |
|---|---|---|---|
| JP | 2009-245740 A | | 10/2009 |
| JP | 2011-529243 A | | 12/2011 |
| JP | 2012031025 A | * | 2/2012 |
| JP | 2013-037992 A | | 2/2013 |
| JP | 2015-005398 A | | 1/2015 |
| JP | 2015-048280 A | | 3/2015 |
| JP | 2015-050071 A | | 3/2015 |
| JP | 2015-050072 A | | 3/2015 |
| JP | 2015-088391 A | | 5/2015 |
| JP | 2015-088392 A | | 5/2015 |
| JP | 2016-072210 A | | 5/2016 |
| WO | 2010/009680 A1 | | 1/2010 |
| WO | 2014/038521 A1 | | 3/2014 |

OTHER PUBLICATIONS

Machine Translation of JP2013037992A (Year: 2019).*
Machine Translation of JP2012031025A (Mar. 2020) (Year: 2020).*
Tong et al., "Highly Conductive Li Garnets by a Multielement Doping Strategy," Inorganic Chemistry, 2015, vol. 54, pp. 3600-3607.
May 16, 2017 International Search Report issued in International Patent Application No. PCT/JP2017/009778.

* cited by examiner

|  | XRD ANALYSIS PHASE ||
|  | MAIN PHRASE | CONTAMINATING PHASE |
| --- | --- | --- |
| EXAMPLE 1 | GARNET | NONE |
| EXAMPLE 2 | GARNET | NONE |
| EXAMPLE 3 | GARNET | NONE |
| EXAMPLE 4 | GARNET | NONE |
| EXAMPLE 5 | GARNET | NONE |
| COMPARATIVE EXAMPLE 1 | GARNET | NONE |
| COMPARATIVE EXAMPLE 2 | GARNET, $La_2Zr_2O_7$ | $Li_4SiO_4$ |

FIG. 9

|  | LITHIUM IONIC CONDUCTIVITY (S/cm) ||| BULK DENSITY (%) |
|  | BULK | GRAIN BOUNDARY | TOTAL |  |
| --- | --- | --- | --- | --- |
| EXAMPLE 1 | $2.1 \times 10^{-4}$ | $3.9 \times 10^{-4}$ | $1.3 \times 10^{-4}$ | 73.2 |
| EXAMPLE 2 | $1.1 \times 10^{-4}$ | $4.0 \times 10^{-4}$ | $8.6 \times 10^{-5}$ | 78.1 |
| EXAMPLE 3 | $1.7 \times 10^{-4}$ | $4.0 \times 10^{-4}$ | $1.2 \times 10^{-4}$ | 75.0 |
| EXAMPLE 4 | $8.7 \times 10^{-5}$ | $8.5 \times 10^{-4}$ | $7.9 \times 10^{-5}$ | 70.7 |
| EXAMPLE 5 | $2.3 \times 10^{-4}$ | $1.9 \times 10^{-3}$ | $2.1 \times 10^{-4}$ | 98.2 |
| COMPARATIVE EXAMPLE 1 | $1.4 \times 10^{-4}$ | $8.1 \times 10^{-5}$ | $5.1 \times 10^{-5}$ | 49.2 |
| COMPARATIVE EXAMPLE 2 | $2.6 \times 10^{-5}$ | $2.4 \times 10^{-6}$ | $2.2 \times 10^{-6}$ | 48.3 |

FIG. 10

SOLID ELECTROLYTE AND LITHIUM ION BATTERY

TECHNICAL FIELD

The present invention relates to a solid electrolyte and a lithium ion battery using the solid electrolyte.

BACKGROUND ART

As a solid electrolyte for lithium ion battery, for example, PTL 1 discloses a silicon-containing lithium lanthanum titanate composite solid electrolyte material and a method of manufacturing the same. According to PTL 1, amorphous silicon (Si) or a Si compound is introduced to a grain boundary between lithium lanthanum titanate crystal particles by adding a lithium lanthanum titanate complex compound to a silicon precursor solution, heating and drying the mixture thereof, and then pelleting and firing the mixture. This indicates that the grain boundary conductivity is markedly improved.

In addition, for example, PTL 2 discloses a method of forming a titanium oxide type solid electrolyte by heating and firing a precursor solution containing water and a water-soluble titanium compound. According to PTL 2, since the precursor solution can contain each element supply source such as titanium, lithium (Li), and lanthanum (La) at a relatively high concentration, titanium oxide type solid electrolyte having a desired volume can be formed by reducing the number of times of applying and firing of a solution as compared with a sol-gel method using alcohol as a solvent.

CITATION LIST

Patent Literature

PTL 1: JP-A-2011-529243
PTL 2: JP-A-2003-346895

SUMMARY OF INVENTION

Technical Problem

However, in the above PTLs 1 and 2, when firing is performed at a high temperature of 1000° C. or higher, there is a concern in that Li is extracted from a fired body or by-products are generated by a heat treatment, and thereby a composition of the fired body is changed. Here, when a temperature of the heat treatment is set to be lowered in order to suppress the composition change of the fired body, there is a problem in that an interface between crystal particles is not sufficiently fired, and thereby grain boundary resistance is increased.

In addition, in a case where the solid electrolyte is formed using a wet chemistry method disclosed in the above PTLs 1 and 2, there is also a problem in that a product forms a uniform layer, and thus an interface in the product is clear and interface resistance is likely to occur.

Solution to Problem

The invention has been made to solve at least a part of the above problems, and can be realized as the following aspects or application examples.

Application Example

A solid electrolyte according to this application example includes a first electrolyte which is garnet-type or garnet-like type crystalline and a second electrolyte which is ion-conductive amorphous, in which the first electrolyte is a lithium composite metal compound, and the second electrolyte contains Li and at least two kinds of metal elements selected from group 5 elements in period 5 or higher or group 15 elements in period 5 or higher.

According to this application example, from the viewpoint of a configuration in which the first electrolyte which is crystalline and the second electrolyte which is amorphous are bonded to each other, an effect of reducing resistance occurring at a crystal interface can be obtained as compared with a case where the first electrolytes which are crystalline are directly bonded to each other. In addition, the above configuration contributes to stabilization of a cubic crystal in firing of the garnet-type or garnet-like type crystalline at a low temperature, and thus it is possible to secure ionic conductivity in crystalline without performing the firing at the high temperature. In addition, a portion of metal elements contained in the lithium composite metal compounds constituting the first crystalline electrolyte is substituted with at least two kinds of metal elements, contained in the second electrolyte, and selected from group 5 elements in period 5 or higher or group 15 elements in period 5 or higher, and thereby a concentration gradient of the metal element is generated between the first crystalline electrolyte and the second amorphous electrolyte. With this, a boundary between the first electrolyte and the second electrolyte becomes unclear, and as compared with a case where the boundary is clear, it is possible to reduce the grain boundary resistance and realize high ionic conductivity.

In the solid electrolyte according to the application example, it is preferable that an atomic crystal radius of the metal element is 78 pm or more.

According to this configuration, even when the heat treatment is performed, the metal element having an atomic crystal radius of 78 pm or more is hardly extracted from the first electrolyte which is garnet-type or garnet-like type crystalline, and thus stable ionic conductivity can be obtained.

In the solid electrolyte according to the application example, it is preferable that the first electrolyte is a lithium composite metal compound containing Li, La, and Zr, and two kinds of the metal elements are selected from Nb, Ta, Sb, and Bi.

According to this configuration, a portion of Zr among the lithium composite metal compounds constituting the first electrolyte is substituted with two kinds of the metal elements selected from Nb, Ta, Sb, and Bi, and thus excellent ionic conductivity can be realized.

In the solid electrolyte according to the application example, the first electrolyte is a lithium composite metal compound containing Li, La, and Zr, and three kinds of the metal elements may be selected from Nb, Ta, Sb, and Bi.

According to this configuration, a portion of Zr among the lithium composite metal compounds constituting the first electrolyte is substituted with three kinds of the metal elements selected from Nb, Ta, Sb, and Bi, and thus a solid electrolyte having excellent ionic conductivity can be realized.

The solid electrolyte according to the application example preferably further includes a third electrolyte which is amorphous and is formed of an oxide containing Li and B.

According to this configuration, since the first electrolyte is bonded to not only the second electrolyte but also the third electrolyte, a solid electrolyte having high ionic conductivity can be realized by effectively utilizing the first electrolyte.

Application Example

A lithium ion battery according to this application example includes a solid electrolyte layer formed of the solid electrolyte according to the above application example; an electrode provided on one surface of the solid electrolyte layer; and a current collector provided on the other surface of the solid electrolyte layer.

According to this application example, a solid electrolyte in which the grain boundary resistance is reduced and the ionic conductivity is secured is used, and thus it is possible to provide a lithium ion battery having excellent charge and discharge characteristics.

In the lithium ion battery according to the application example, it is preferable that the electrode is formed of metallic lithium, and a positive electrode active material layer containing Li is provided between the other surface of the solid electrolyte layer and the current collector.

According to this configuration, an electrode and a positive electrode active material layer which serve as lithium sources are provided, and thus it is possible to provide a lithium ion battery having excellent charge and discharge characteristics and a large capacity.

BRIEF DESCRIPTION OF DRAWINGS

FIG. 9 is a table illustrating analysis results of X-ray diffraction of a solid electrolyte of Examples 1 to 5 and Comparative Examples 1 and 2.

FIG. 10 is a table indicating a measurement result and a bulk density of lithium ionic conductivity in the solid electrolyte pellet of Examples 1 to 5, and Comparative Examples 1 and 2.

DESCRIPTION OF EMBODIMENTS

Figure 1:
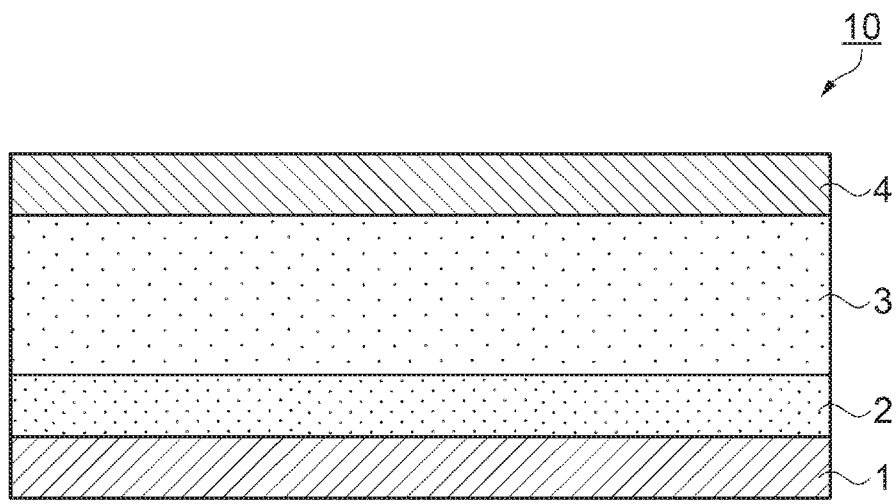
FIG. 1 is a schematic sectional view illustrating a configuration of a lithium ion battery.

Hereinafter, embodiments embodying the invention will be described with reference to the drawings. Note that, the drawing to be used is appropriately displayed by being enlarged or reduced so as to make explanation parts recognizable.

First Embodiment

First, an example of a lithium ion battery to which a solid electrolyte of this embodiment is applied will be described with reference to FIG. 1. FIG. 1 is a schematic sectional view illustrating a configuration of the lithium ion battery.

As illustrated in FIG. 1, the lithium ion battery 10 has a configuration in which a current collector 1, an active material layer 2, a solid electrolyte layer 3, and an electrode 4 are stacked in this order. The lithium ion battery 10 is in a disk form having an outer shape of, for example, φ 3 mm to 30 mm and a thickness of 150 μm to 200 μm (micrometer). Such a thin lithium ion battery 10 may be used alone, or a plurality of lithium ion batteries 10 may be stacked to be used. Hereinafter, each configuration of the lithium ion battery 10 will be described.

Examples of the current collector 1 include one kind of metal (metal simple substance) selected from metal groups of copper (Cu), magnesium (Mg), titanium (Ti), iron (Fe), cobalt (Co), nickel (Ni), zinc (Zn), aluminum (Al), germanium (Ge), indium (In) gold (Au), platinum (Pt), silver (Ag), and palladium (Pd), and an alloy formed of two or more kinds of metals selected from the metal groups.

The shape of the current collector 1 may be a plate shape, a foil shape, a net shape, or the like, and the surface thereof may be smooth, or irregularities may be formed thereon. A thickness of such a current collector 1 is, for example, approximately 20 μm.

In the lithium ion battery 10, a material of the active material layer 2 is differentiated depending on whether the current collector 1 is used on the positive electrode side or on the negative electrode side.

In a case where the current collector 1 is used on the positive electrode side, the active material layer 2 is formed by using a positive electrode active material. Examples of the positive electrode active material include a lithium composite metal compound including, for example, two or more kinds of metal elements containing lithium (Li). More specifically, examples of the lithium composite metal compound include a lithium composite oxide such as $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. In addition, other than the lithium composite oxide, lithium composite fluoride such as $LiFeF_3$ may be used. Further, those in which a part of atoms of these lithium composite metal compounds is substituted with other transition metals, typical metals, alkali metals, alkali rare earths, lanthanoids, chalcogenides, halogens and the like are also included. In addition, a solid solution of these lithium composite metal compounds may be used as the positive electrode active material.

In a case where the current collector 1 is used on the negative electrode side, the active material layer 2 is formed by using a negative electrode active material. Examples of the negative electrode active material include a silicon-manganese alloy (Si—Mn), a silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), indium oxide (ITO) doped with tin (Sn), zinc oxide (AZO) doped with aluminum (Al), zinc oxide (GZO) doped with gallium, tin oxide (ATO) doped with antimony, tin oxide (FTO) doped with fluorine (F), carbon material, a material in which lithium ions are inserted between layers of a carbon materials, anatase phase of $TiO_2$, a lithium composite oxide such as $Li_4Ti_5O_{12}$ and $Li_2Ti_3O_7$, and metallic lithium.

A thickness of such an active material layer 2 is, for example, approximately 20 μm to 400 μm.

In the case where the current collector 1 is used on the positive electrode side, an electrode 4 becomes negative electrode. In this case, as the current collector 1, for example, aluminum (Al) can be used, and as the electrode 4, for example, metallic lithium can be used. A thickness of the electrode 4 is, for example, approximately 40 μm. If metallic lithium is used as the electrode 4 which functions as a negative electrode, it becomes a lithium source in charge and discharge, and thereby a large capacity lithium ion battery 10 can be realized.

The solid electrolyte layer 3 to which the solid electrolyte of the embodiment is applied includes a first electrolyte which is crystalline, and a second electrolyte which is ion-conductive amorphous, and has excellent ionic conductivity. A thickness of the solid electrolyte layer 3 is, for example, 50 nm (nanometer) to 100 μm. The lithium ion battery 10 provided with such a solid electrolyte layer 3 has excellent battery characteristics (charge and discharge characteristics). Hereinafter, the solid electrolyte layer 3 in the lithium ion battery 10 of the embodiment will be described in detail.

Although described in detail later, the solid electrolyte layer 3 may be combined with the active material layer 2.

<Solid Electrolyte Layer>

Figure 2:
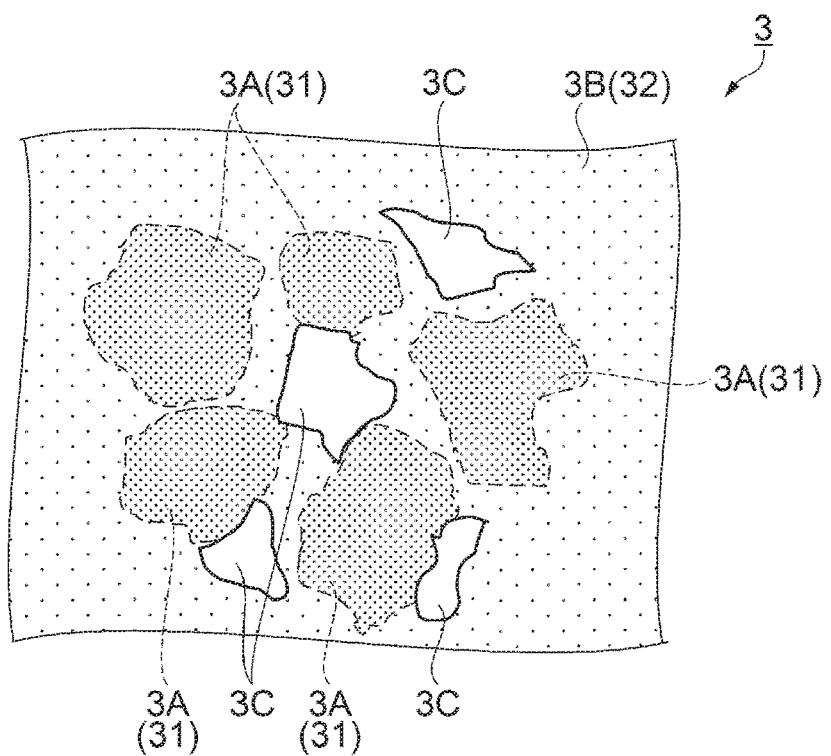
FIG. 2 is a schematic view illustrating the configuration of a solid electrolyte layer of a first embodiment.

FIG. 2 is a schematic view illustrating a configuration of the solid electrolyte layer of the first embodiment. As illustrated in FIG. 2, the solid electrolyte layer 3 includes at least a first part 3A containing a first electrolyte 31 which is crystalline, a second part 3B containing a second electrolyte 32 which is ion-conductive amorphous, and a third part 3C which is a void. The void communicates with the inside of the solid electrolyte layer 3. That is, the solid electrolyte layer 3 is porous.

A structure of such a solid electrolyte layer 3 can be confirmed by, for example, a transmission electron microscope, but a boundary between the first part 3A and the second part 3B in the solid electrolyte layer 3 of the embodiment is not necessarily clear, and specifically, as described later, the concentration of at least two kinds of the metal elements contained in the first electrolyte 31 and the second electrolyte 32 is continuously changed between the first part 3A and the second part 3B, and thereby the boundary between the first part 3A and the second part 3B becomes unclear. Note that, as to the configuration of the solid electrolyte layer as illustrated in FIG. 2, a state of observation is schematically illustrated by the transmission electron microscope and does not necessarily correspond to a state of actual observation.

As the electrolyte material constituting the first electrolyte 31 and the second electrolyte 32, oxide, sulfide, nitride, hydride which contain lithium such as $Li_{5.5}Ga_{0.5}La_3Zr_2O_{12}$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{10.3}(PO_4)_3$, $Li_{2.88}PO_{3.73}N_{0.14r}$, $LiNbO_3$, $Li_{0.35}La_{0.55}TiO_3$, $Li_3NI_2$, $Li_6NBr_3$, $Li_2SO_4$, $Li_4SiO_4$, $Li_4GeO_4$, $Li_3VO_4$, $Li_4GeO_4$—$Zn_2GeO_2$, $LiMoO_4$, $Li_3PO$, $Li_4ZrO_4$, $Li_{2+x}Cl_{-x}B_xO_3$, $LiBH_4$, $Li_{7-x}Ps_{6-x}Cl_x$, and $Li_{10}GeP_2S_{12}$ or crystalline, amorphous and partially crystallized glasses of these partially substituted substances can be suitably used.

In the embodiment, it is preferable that the first electrolyte 31 exhibits excellent ionic conductivity and is electrochemically stable, and the garnet-type or garnet-like type crystalline represented by indicative formula of $Li_{7-x}A_{2-x}M1_xM2O_{12}$ (0.1≤x≤0.6) is used.

In the indicative formula, as A, any metal element forming the garnet-type or garnet-like type crystal can be used. Particularly, in order to form a crystal with high ionic conductivity, zirconium (Zr) is preferable.

M1 is the metal element of the invention, and any element forming the garnet-type or garnet-like type crystal can be used. Particularly, in order to form a crystal with high ionic conductivity, at least two kinds of metal elements are preferably selected from niobium (Nb) and tantalum (Ta) of the group 5 elements in the period 5 or higher, and antimony (Sb) and bismuth (Bi) of the group 15 elements in the same period 5 or higher.

As for atomic crystal radii (unit: pm (picometer)) of these metal elements, Nb is 78 pm, Ta is 78 pm, Sb is 90 pm, and Bi is 117 pm, which are all 78 pm or more (Crystal·molecular structure design program, CrystalMaker (registered trademark), manufactured by Hulinks).

As M2, any metal element forming the garnet-type or garnet-like type crystal can be used. Particularly, a lanthanide element is preferable, and lanthanum (La) is particularly preferable in order to form a crystal with high ionic conductivity.

The second electrolyte 32 is amorphous and formed of the above-described electrolyte materials, and similar to the first electrolyte 31, contains at least two kinds of the metal elements selected from Nb and Ta of the group 5 elements in the period 5 or higher, and Sb and Bi of the group 15 elements in the same period 5 or higher.

<Method of Manufacturing Solid Electrolyte>

Figure 3:
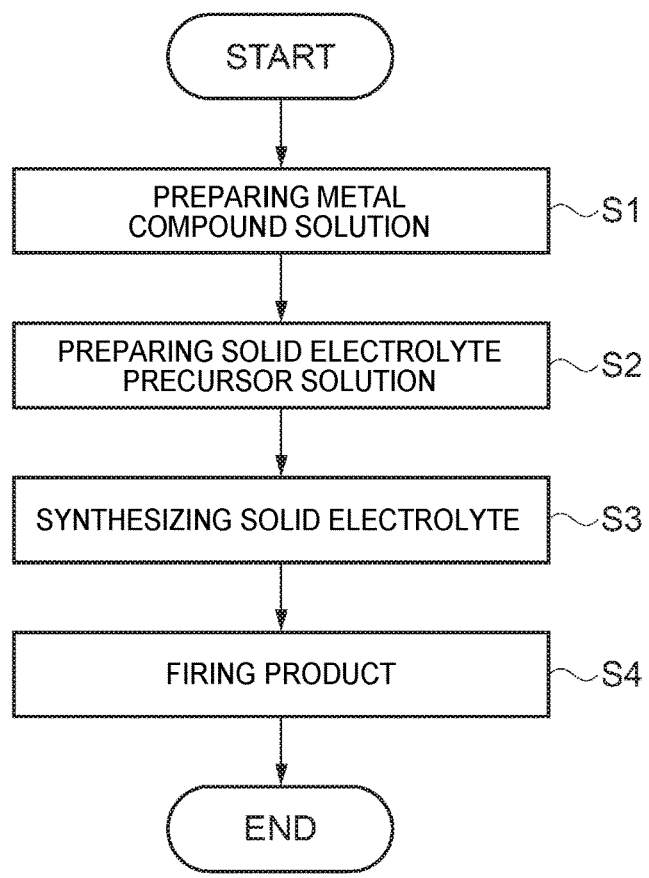
FIG. 3 is a flowchart illustrating a method of manufacturing the solid electrolyte of the first embodiment.

Next, a method of manufacturing the solid electrolyte for constituting the solid electrolyte layer 3 will be described with reference to FIG. 3. FIG. 3 is a flowchart illustrating a method of manufacturing the solid electrolyte of the first embodiment. The method of manufacturing the solid electrolyte of the embodiment is a wet method, and includes a metal compound solution preparing step (step S1), a solid electrolyte precursor solution preparing step (step S2), a solid electrolyte synthesizing step (step S3), and a product firing step (step S4).

In a metal compound solution preparing step of step S1, for each metal contained in the solid electrolyte, each metal compound is obtained as a metal compound, and a metal compound solution is prepared by dissolving the metal compound in a solvent. Examples of the metal compound prepared in the embodiment include a lithium compound, a lanthanum compound, a zirconium compound, a niobium compound, a tantalum compound, an antimony compound, and a bismuth compound.

Examples of the lithium compound (lithium source) include lithium metal salts such as lithium chloride, lithium nitrate, lithium acetate, lithium hydroxide, and lithium carbonate, lithium alkoxide such as lithium methoxide, lithium ethoxide, lithium propoxide, lithium isopropoxide, lithium butoxide, lithium isobutoxide, lithium secondary butoxide, lithium tertiary butoxide, and dipivaloyl methanol tritium, and these can be used alone or two or more kinds thereof can be used in combination.

Examples of the lanthanum compound (lanthanum source) include lanthanum metal salt such as lanthanum chloride, lanthanum nitrate, lanthanum acetate, and lanthanum alkoxide such as lanthanum methoxide, lanthanum ethoxide, lanthanum propoxide, lanthanum isopropoxide, lanthanum butoxide, lanthanum isobutoxide, lanthanum secondary butoxide, lanthanum tertiary butoxide, and dipivaloyl methanate lanthanum, and these can be used alone or two or more kinds thereof can be used in combination.

Examples of the zirconium compound (zirconium source) include zirconium metal salt such as zirconium chloride, zirconium oxychloride, zirconium oxynitrate, zirconium oxyacetate, and zirconium acetate, zirconium alkoxide such as zirconium methoxide, zirconium ethoxide, zirconium propoxide, zirconium isopropoxide, zirconium butoxide, zirconium isobutoxide, zirconium secondary butoxide, zirconium tertiary butoxide, and dipivaloyl methanatozirconium, and these can be used alone or two or more kinds thereof can be used in combination.

Further, examples of the niobium compound (niobium source) as a compound which is a metal element among the group 5 elements in period 5 or higher, and having an atomic crystal radius of 78 pm or more include a niobium metal salt such as niobium chloride, niobium oxychloride, niobium oxalate, and niobium acetylacetone, niobium alkoxide such as niobium ethoxide, niobium propoxide, niobium isopropoxide, and niobium secondary butoxide, and these can be used alone or two or more kinds thereof can be used in combination.

Further, examples of the tantalum compound (tantalum source) as a compound which is a metal element among the group 5 elements in period 5 or higher, and having an atomic crystal radius of 78 pm or more include tantalum metal salts such as tantalum chloride, and tantalum bromide, tantalum alkoxide such as pentamethoxytantalum, pentaethoxytantalum, pentaisopropoxytantalum, penta normal propoxy tantalum, pentaisobutoxytantalum, penta normal butoxy tantalum, penta secondary butoxy tantalum, and penta tertiary butoxy tantalum, and these can be used alone or two or more kinds thereof can be used in combination.

In addition, examples of the antimony compound (antimony source) as a compound which is a metal element among the group 15 elements in period 5 or higher, and having an atomic crystal radius of 78 pm or more include antimony metal salt such as antimony bromide, antimony chloride, and antimony fluoride, antimony alkoxide such as trimethoxyantimony, triethoxyantimony, triisopropoxyantimony, trinormal propoxy antimony, triisobutoxy antimony, and trinormal butoxy antimony, and these can be used alone or two or more kinds thereof can be used in combination.

Similarly, examples of the bismuth compound (bismuth source) as a compound which is a metal element among the group 15 elements of period 5 or higher, and having an atomic crystal radius of 78 pm or more include bismuth metal salt such as bismuth tribromide, bismuth trichloride, bismuth trifluoride, bismuth triiodide, bismuth nitrate, bismuth oxychloride, bismuth tribenzoate, bismuth citrate, bismuth acetate, and bismuth 2 ethylhexanoate, bismuth alkoxide such as bismuth triethoxide, bismuth tri-normal propoxide, bismuth triisopropoxide, bismuth trinormal butoxide, bismuth triisobutoxide, bismuth canedary butoxide, vismaster sarybutoxide, and bismuth tritertary amyloxide, and these can be used alone or two or more kinds thereof can be used in combination.

As the solvent, a single solvent or a mixed solvent of water and an organic solvent capable of dissolving each of a lithium compound, a lanthanum compound, a zirconium compound, and a metal compound having an atomic crystal radius of 78 pm or more is used.

Such an organic solvent is not particularly limited, and examples thereof include alcohols such as methanol, ethanol, n-propyl alcohol, isopropyl alcohol, allyl alcohol, and 2-n-butoxyethanol, glycols such as ethylene glycol, propylene glycol, butylene glycol, hexylene glycol, pentane diol, hexane diol, heptane diol, and dipropylene glycol, ketones such as acetone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, and propionic acid, and aromatic compounds such as toluene, o-xylene, and p-xylene.

The metal compound solution is prepared by weighing the above-described metal compound so as to have a concentration of molar (mol) unit, introducing the metal compound into a selected solvent, mixing the metal compound and the solution, and dissolving the mixture. In order to dissolve the metal compound sufficiently, if necessary, the solvent is warmed to be mixed with the metal compound. Then, the process proceeds to step S2.

In the solid electrolyte precursor solution preparing step of step S2, in consideration of the composition of the solid electrolyte to be obtained as a product, a metal compound solution in which the metal compound is dissolved for each metal source is weighed and then mixed together so as to obtain a solid electrolyte precursor solution. Specifically, three kinds of metal compound solutions each containing a lithium compound, a lanthanum compound, and a zirconium compound, and a plurality of kinds of metal compound solutions each containing at least two kinds of metal compounds selected from a niobium compound, a tantalum compound, an antimony compound, and a bismuth compound are mixed together at a predetermined mixing ratio. Then, the process proceeds to step S3.

In the solid electrolyte synthesizing step of step S3, a solvent component is removed by heating the solid electrolyte precursor solution obtained in the step S2 so as to obtain a product. The removal of the solvent component is performed in an open state to the atmosphere. Then, the process proceeds to step S4.

In the product firing step of step S4, the product obtained in step S4 is fired. Since it is preferable to completely remove the solvent component that may remain in the product, the firing step is preferably performed stepwise. In the embodiment, a preliminarily fired body obtained by temporarily firing the product at a temperature of lower than 900° C. is ground by an agate mortar to be finely pulverized. A prescribed amount of the pulverized preliminarily fired body is weighed, the pulverized preliminarily fired body is put into a die (tablet former), and is pressure-molded so as to obtain a molded body. The obtained molded body is placed in a crucible made of magnesium oxide so as not to change the composition at the time of main firing, the crucible is covered with a lid made of magnesium oxide, and the main firing is performed at a temperature of, for example, 900° C. or higher and lower than 1000° C. so as to obtain a solid electrolyte.

According to the method of manufacturing the solid electrolyte of the first embodiment, it is possible to obtain a solid electrolyte including a first electrolyte 31 which is garnet-type or garnet-like type crystalline, and a second electrolyte 32 which is ion-conductive amorphous. Since the solid electrolyte (solid electrolyte layer 3) has a configuration in which a second part 3B containing the second electrolyte 32 is connected to a first part 3A containing the first electrolyte 31, a solid electrolyte having high ionic conductivity without firing at a high temperature can be realized or manufactured by reducing the resistance occurring at each crystal interface as compared with a case of having a configuration in which a plurality of crystallines are directly connected.

Further, among the garnet-type or garnet-like type crystals, a portion of Zr is substituted with at least two kinds of metal elements among Nb, Ta, Sb, and Bi which have an atomic crystal radius of 78 pm or more. Since the viewpoint that the metal element is contained also in the second electrolyte 32, a concentration of the metal element in the solid electrolyte is high in the second electrolyte 32 which is amorphous as compared with that in the first electrolyte 31 which is crystalline. Accordingly, a concentration gradient of the metal element is generated between the first electrolyte 31 and the second electrolyte 32. With this, the concentration of the metal element is continuously changed at the boundary between the first electrolyte 31 and the second electrolyte 32, and thus the boundary between the first electrolyte 31 and the second electrolyte 32, which can be confirmed by means such as a transmission electron microscope becomes unclear. In other words, as compared with a case where the boundary between the first electrolyte 31 and the second electrolyte 32 is clear, the charge transfer between the first electrolyte 31 and the second electrolyte 32 is performed smoothly, and when using such a solid electrolyte, a solid electrolyte layer 3 having excellent ionic conductivity can be formed.

The lithium ion battery 10 provided with the solid electrolyte layer 3 having such an excellent ionic conductivity has excellent battery characteristics (charge and discharge characteristics). Further, when the current collector 1 is on the positive electrode side, the active material layer 2 is formed on the current collector 1 by using the positive electrode active material, and the electrode 4 is formed as a negative electrode on the solid electrolyte layer 3 using metallic lithium, it is possible to obtain a lithium ion battery having excellent battery characteristics and a large capacity.

Note that, in the method of manufacturing the solid electrolyte, among Nb, Ta, Sb, and Bi which are the metal elements having an atomic crystal radius of 78 pm or more, any one of Nb, Ta, and Sb is preferably selected from the viewpoint of exhibiting excellent amorphous forming ability of the second electrolyte 32. In addition, a metal element having an atomic crystal radius which is larger than Bi (117 pm) is difficult to substitute Zr in the garnet-type or garnet-like type crystal structure, and thus it is preferable to select a metal element which is the same as Bi or has an atomic crystal radius smaller than Bi.

Second Embodiment

Figure 4:
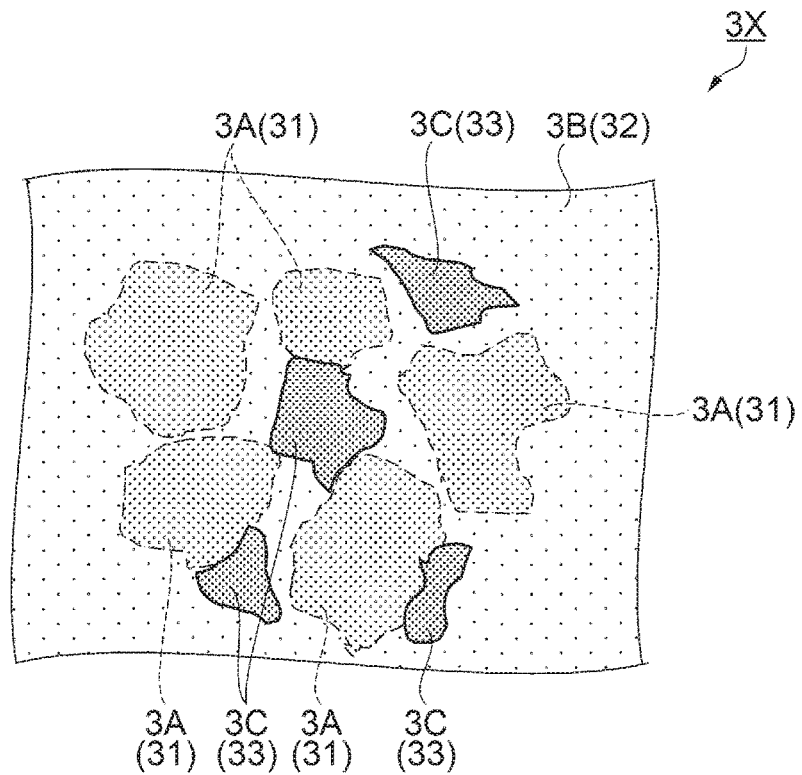
FIG. 4 is a schematic diagram illustrating a configuration of a solid electrolyte layer of a second embodiment.
Figure 5:
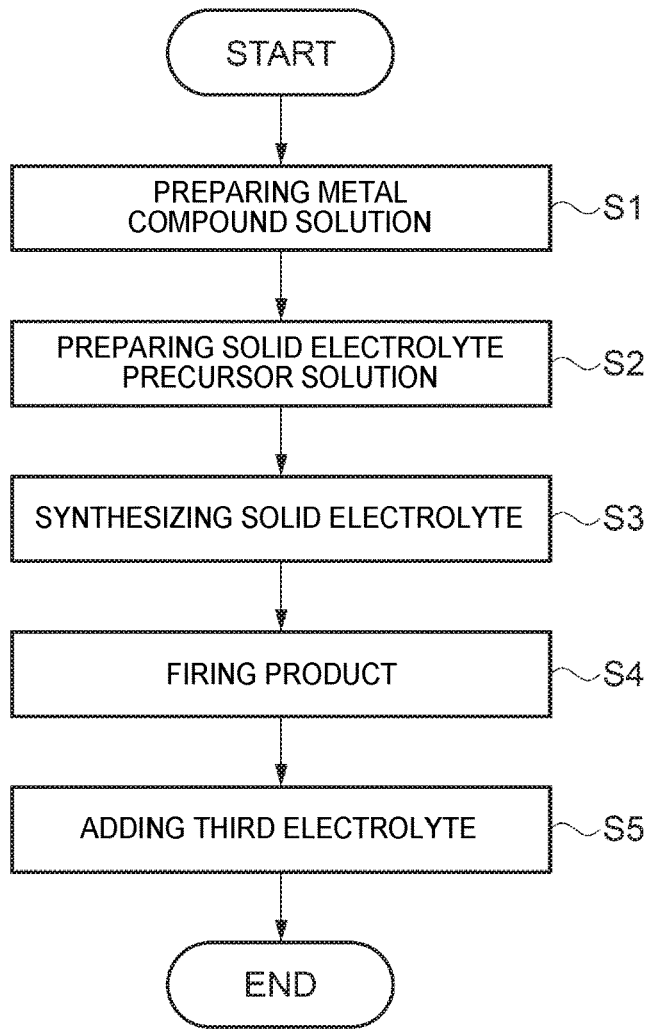
FIG. 5 is a flowchart illustrating a method of manufacturing the solid electrolyte of the second embodiment.
Figure 6:
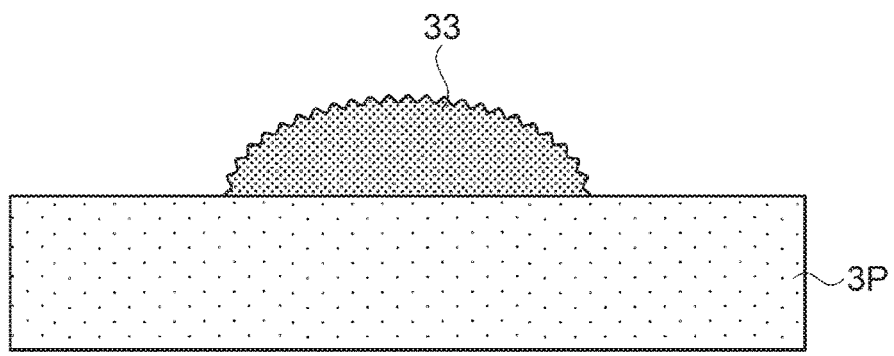
FIG. 6 is a schematic sectional view illustrating the method of manufacturing the solid electrolyte of the second embodiment.

Next, the method of manufacturing the solid electrolyte of the second embodiment will be described with reference to FIGS. 4 to 6. FIG. 4 is a schematic diagram illustrating the configuration of a solid electrolyte layer of the second embodiment, FIG. 5 is a flowchart illustrating a method of manufacturing the solid electrolyte of the second embodiment, and FIG. 6 is a schematic sectional view illustrating the method of manufacturing the solid electrolyte of the second embodiment. The solid electrolyte of the second embodiment is obtained by adding a third electrolyte to the solid electrolyte of the first embodiment, and the same reference numerals are given to the same configurations as those of the first embodiment, and a detailed description thereof will not be repeated.

As illustrated in FIG. 4, a solid electrolyte layer 3X of the embodiment includes at least a first part 3A containing a first crystalline electrolyte 31, a second part 3B containing a second amorphous electrolyte 32, and a third part 3C containing a third amorphous electrolyte 33. In other words, the third part 3C which is a void in the solid electrolyte layer 3 of the first embodiment is filled with the third electrolyte 33.

For the third electrolyte 33, the above-described electrolyte materials of the first electrolyte 31 and the second electrolyte 32 can be used, and particularly, a melting point is preferably lower than 900° C. Specifically, a material which has ionic conductivity and is amorphous at room temperature is preferable, and examples thereof include lithium composite oxides containing Li and B such as $Li_3BO_3$, $Li_3BO_3$—$Li_4SiO_4$, $Li_3BO_3$—$Li_3PO_4$, $Li_3BO_3$—$Li_2SO_4$, and $Li_2CO_3$—$Li_3BO_3$.

The ionic conductivity of $Li_3BO_3$ is approximately $6.0 \times 10^{-10}$ S/cm, and the melting point is approximately 820° C. The ionic conductivity of $Li_3BO_3$—$Li_4SiO_4$ is approximately $4.0 \times 10^{-6}$ S/cm, and the melting point is approximately 720° C. The ionic conductivity of $Li_3BO_3$—$Li_3PO_4$ is approximately $1.0 \times 10^{-7}$ S/cm, and the melting point is approximately 850° C. The ionic conductivity of $Li_3BO_3$—$Li_2SO_4$ is approximately $1.0 \times 10^{-6}$ S/cm, and the melting point is approximately 700° C. The ionic conductivity of $Li_{2.2}C_{0.8}B_{0.2}O_3$ which is $Li_2CO_3$—$Li_3BO_3$ type is approximately $8.0 \times 10^{-7}$ S/cm, and the melting point is 685° C.

As illustrated in FIG. 5, the method manufacturing the solid electrolyte of the embodiment (solid electrolyte layer 3X) includes a third electrolyte adding step (step S5) in addition to the above-described step S1 to step S4 of the first embodiment. Hereinafter, step S5 added to the first embodiment will be described.

In the third electrolyte adding step of step S5, first, powders of the third electrolyte 33 are prepared. In addition, as illustrated in FIG. 6, a predetermined amount of the powders of the third electrolyte 33 is weighed and placed on a fired body 3P after the main firing in step S4. The fired body 3P on which the powders of the third electrolyte 33 are placed is put into an electric muffle furnace and heated at a temperature which is higher than the melting point of the third electrolyte 33 and is lower than 900° C. which is a temperature at the main firing so as to melt the powders of the third electrolyte 33. Since the fired body 3P is a porous body having voids and having a bulk density of about 50% to 70%, and the voids communicate internally, a melt of the third electrolyte 33 is impregnated into the voids of the fired body 3P due to capillary phenomenon. Then, by rapidly cooling to room temperature, the melt is solidified and the solid electrolyte layer 3X in which the voids are filled with the third amorphous electrolyte 33 is formed.

The bulk density (a ratio of a solid content occupying a total volume excluding voids) in the fired body 3P can be obtained by dividing the weight of the fired body 3P by the value obtained by multiplying the volume of the fired body 3P by the specific gravity. Since the volume of the void can be obtained if the bulk density is known, the predetermined amount of the third electrolyte 33 necessary for filling the void can also be calculated in advance.

Although it is preferable to fill all of the voids contained in the fired body 3P with the third electrolyte 33, it is not always necessary to fill all the voids, and some of the voids may remain.

According to the solid electrolyte layer 3X of the second embodiment and the manufacturing method thereof, when the third part 3C which is the void in the first embodiment is filled with the third electrolyte 33, the first crystalline electrolyte 31 can be effectively utilized so as to further improve ionic conductivity. In addition, when the lithium ion battery 10 is configured to include such a solid electrolyte layer 3X, it is possible to provide the lithium ion battery 10 having more excellent battery characteristics (charge and discharge characteristics).

Note that, the method of adding the third electrolyte 33 to the fired body 3P containing the first electrolyte 31 and the second electrolyte 32 is not limited to the method of impregnating the melt of the third electrolyte 33. For example, the fired body 3P is again put into the agate mortar, ground, and mixed with the powders of the third electrolyte 33 so as to obtain a mixture. The solid electrolyte layer 3X which is a solid electrolyte molded body may be manufactured in such a manner that the obtained mixture is put into a die (tablet former) and is pressure-molded to form a molded body, and the molded body is fired at a temperature lower than the melting point of the third electrolyte 33 and cooled. According to this, since the firing is performed at a temperature lower than the melting point of the third electrolyte 33, even if the heat treatment is performed, Li does not easily come out of the molded body.

In addition, in a case where the powders of the third electrolyte 33 are mixed, it is preferable to mix such that the volume ratio of the third electrolyte 33 to the powders of the fired body 3P is about 36% to 75%. When the volume ratio (addition ratio) of the third electrolyte 33 is in the above range, the particles of the composite of the first electrolyte 31 and the second electrolyte 32 in the solid electrolyte are disposed such that an average distance therebetween is larger than a median diameter of the composite of the first electrolyte 31 and the second electrolyte 32, and the third electrolyte is sandwiched between the particles, thereby easily obtaining high ionic conductivity.

<Method of Manufacturing First Electrolyte>

The method of forming the garnet-type or garnet-like type first electrolyte 31 in the solid electrolyte of the first embodiment and the second embodiment is not limited to the wet method. Various synthetic methods can be applied according to desirable application forms of various solution methods such as a solid phase synthesis method, a sol-gel method, a metal organic decomposition method (MOD).

Hereinafter, an example of a method of synthesizing garnet-type or garnet-like type crystal particles by the solid phase synthesis method will be described.

In order to obtain garnet-type or garnet-like type crystal particles by the solid phase synthesis method, at least one kind of compound containing lithium, at least one kind of compound containing zirconium, at least one kind of compound containing lanthanum, and at least two kinds selected from niobium, tantalum, antimony and bismuth are weighed and mixed at a predetermined ratio, and the mixture which is set as a starting material can be synthesized by being heated in an atmosphere containing at least oxygen gas such as air or an argon-oxygen mixture.

As the raw material containing lithium, for example, oxides such as $Li_2O$ and $Li_2O_2$, oxoacid salts such as $Li_2CO_3$, $LiHCO_3$, and $LiNO_3$, hydroxides such as $LiOH$, organic acid salts such as $LiCH_3COO$, halides such as $LiF$, an inorganic compound such as $Li_3N$, a lithium metal, and a lithium alloy can be suitably used in accordance with a desired manufacturing method. If necessary, a plurality of these raw materials containing lithium may be used in combination. Further, among the constituent elements of the garnet-type or garnet-like type crystal, double oxides such as $Li_2ZrO_3$ and $LiNbO_3$ containing at least lithium and containing one or more kinds of elements other than lithium also can be used, and among them, $Li_2CO_3$ is particularly preferable.

As the raw material containing lanthanum, for example, oxides such as $La_2O_3$, oxoacid salts such as $La_2(CO_3)_3$, $LaCO_3OH$, and $La(NO_3)_3$, hydroxides such as $La(OH)_3$, organic acid salts such as $La(CH_3COO)_3$, halides such as $LaF_3$, inorganic compounds such as $LaC_2$, $La_2C_3$, and $LaN$, a lanthanum metal, and a lanthanum alloy can be suitably used in accordance with a desired manufacturing method. If necessary, a plurality of these raw materials containing lanthanum may be used in combination. Further, among the constituent elements of the garnet-type or garnet-like type crystal, double oxides such as $La_2ZrO_7$ and $La_2Nb_2O_7$ containing at least lanthanum and containing one or more kinds of elements other than lanthanum also can be used, and among them, $La_2O_3$ is particularly preferable.

As the raw material containing zirconium, for example, oxides such as $ZrO_2$, oxoacid salts such as $ZrCO_3$, $ZrO(NO_3)_2$, and $ZrOSO_4$, hydroxides such as $ZrO(OH)_2$, organic acid salts such as $Zr(C_3H_3O_2)_4$, halides such as $ZrOCl_2$, inorganic compounds such as $ZrC$, $ZrN$, a zirconium metal, and a zirconium alloy can be suitably used in accordance with a desired manufacturing method. If necessary, a plurality of these raw materials containing zirconium may be used in combination. Further, among the constituent elements of the garnet-type or garnet-like type crystal, double oxides such as $Li_2ZrO_3$, $Li_4ZrO_4$, and $La_2Zr_2O_7$ containing at least zirconium and containing one or more kinds of elements other than zirconium also can be used, and among them, $ZrO_2$ is particularly preferable.

As a raw material containing niobium, for example, oxides such as $Nb_2O_5$, oxoacid salts such as $Nb_2(CO_3)_5$ and $Nb_2O_2(SO_4)_3$, hydroxides such as $Nb(OH)_5$ and $NbO_2OH$, halides such as $NbCl_5$, inorganic compounds such as $NbC$, $NbN$, and $NbSe_3$, a niobium metal, and a niobium alloy can be suitably used in accordance with a desired manufacturing method. If necessary, a plurality of these raw materials containing niobium may be used in combination. Further, among the constituent elements of the garnet-type or garnet-like type crystal, double oxides such as $LiNbO_3$ and $La_2Nb_2O_7$ containing at least niobium and containing one or more kinds of elements other than niobium also can be used, and among them, $Nb_2O_5$ is particularly preferable.

As a raw material containing tantalum, for example, oxides such as $Ta_2O_5$, oxoacid salts such as $Ta_2(CO_3)_5$, $TaO(NO_3)_2$, and $Ta_2O_2(SO_4)_3$, hydroxides such as $Ta(OH)_5$ and $TaO_2OH$, halides such as $TaCl_5$, inorganic compounds such as $TaC$, $TaN$, and $TaSe_3$, a tantalum metal, and a tantalum alloy can be suitably used in accordance with a desired manufacturing method. If necessary, a plurality of these raw materials containing tantalum may be used in combination. Further, among the constituent elements of the garnet-type or garnet-like type crystal, double oxides such as $LiTaO_3$ and $La_2Ta_2O_7$ containing at least tantalum and containing one or more kinds of elements other than tantalum also can be used, and among them, $Ta_2O_5$ is particularly preferable.

As a raw material containing antimony, for example, oxides such as $Sb_2O_3$, oxoacid salts such as $Sb_2(CO_3)_3$, $Sb(HCO_3)_5$, and $Sb(NO_3)_3$, hydroxides such as $Sb(OH)_3$, halides such as $SbCl_5$, inorganic compounds such as $SbC$, $SbN$, and $Sb_2Se_3$, an antimony metal, an antimony alloy can be suitably used in accordance with a desired manufacturing method. If necessary, a plurality of these raw materials containing antimony may be used in combination. Further, among the constituent elements of the garnet-type or garnet-like type crystal, double oxides such as $LiSbO_3$ and $La_2Sb_2O_7$ containing at least antimony and containing one or more kinds of elements other than antimony also can be used, and among them, $Sb_2O_3$ is particularly preferable.

As a raw material containing bismuth, for example, oxides such as $Bi_2O_3$, oxoacid salts such as $(BiO)_2CO_3$, $Bi(CH_3COO)O$, $BiO(C_6H_4(OH)COO)$, $4BiNO_3(OH)_2 \cdot BiO(OH)$, $Bi_2(CO_3)O_2 \cdot 0.5H_2O$, hydroxides such as $Bi(OH)_3$, organic acid salts such as $Bi(C_6H_5C_7)$ and $Bi(C_6H_5COO)$, halides such as $BiF_3$ and $BiI_3$, inorganic compounds such as $BiN$ and $BiP$, a lithium metal, and a lithium alloy can be suitably used in accordance with a desired manufacturing method. If necessary, a plurality of these raw materials containing bismuth may be used in combination. Further, among the constituent elements of the garnet-type or garnet-like type crystal, double oxides such as $Bi_2O_3.3ZrO_2$ containing at least bismuth and containing one or more kinds of elements other than bismuth also can be used, and among them, $Bi_2O_3$ is particularly preferable.

The powders of the raw materials exemplified above are weighed and mixed so as to satisfy $Li_{7-x}La_3Zr_{2-x}Nb_xTa_xO_{12}$ (0<x<0.5), for example. At this time, there are no particular limits to a particle size and a particle size distribution of the powder of the raw material, and those subjected to sizing so as to equalize the particle size of the particles or those subjected to a treatment of removing water adsorbed on the surfaces of the particles in advance in a dry atmosphere may be used. A weighing operation may be performed in a dry atmosphere or an inert atmosphere if necessary. Since lithium in the composition formula sometimes desorbs at the time of firing at a high temperature, it may be added in an excess amount of about 0.05% to 20% more than the theoretical composition ratio in advance in accordance with the firing conditions.

As a next step of synthesizing the garnet-type or garnet-like type crystal by the solid-phase synthesis method, an operation of molding into a solid shape so that the particles are in close contact with each other may be performed in order to promote a solid-phase reaction of the weighed and mixed raw material powder and to improve uniformity. There are no particular limits to the shape to be molded and the molding method, and it is possible to use, for example, known methods such as a press process using a die (tablet former) or cold isostatic pressing (CIP). For the purpose of assisting moldability, a so-called binder made of a polymer may be appropriately added.

A heat treatment for the powder mixed with the raw materials or the raw material powder molded body is performed in a temperature range of 540° C. to 1300° C. depending on the desired fired density and crystallinity. The atmosphere during the heat treatment step is not particularly limited, but the heat treatment is preferably performed under an atmosphere having air and oxygen mixed at least for a certain period of time. Further, for the purpose of controlling the desorption reaction of additives and elements, it is also possible to perform the treatment in an inert gas atmosphere for a certain period of time or in a fixed temperature range.

<Method of Manufacturing Lithium Ion Battery>

As a method of manufacturing the lithium ion battery 10 using the solid electrolyte of the first embodiment or the second embodiment, various methods are conceivable. Hereinafter, outlines of various manufacturing methods will be described.

<Solid Phase Method>

As a material, the active material particle, the particles obtained by pulverizing the fired body of the first electrolyte 31 and the second electrolyte 32, and the third electrolyte 33 (if necessary, a conductive auxiliary agent, a binder, and a solvent may be contained) are prepared. The above materials are mixed using an agate mortar, press-molded (or molded into a slurry and green sheet), and subjected to a heat treatment at a temperature lower than the melting point of the third electrolyte 33 (after performing a degreasing step in a case of using a binder) so as to manufacture an active material mixture. The active material mixture in this case is obtained by combining the active material layer 2 in the lithium ion battery 10 as illustrated in FIG. 1 with the solid electrolyte layer 3X of the second embodiment as illustrated in FIG. 4. The current collector 1 and the electrode 4 may be formed in the obtained active material mixture.

<Wet Method>

As a material, the porous body obtained by firing the active material particle, the precursor solutions of the first electrolyte 31 and the second electrolyte 32, and the precursor solution of the third electrolyte 33 are prepared. The voids in the porous body formed of the active material particle are filled with the precursor solutions of the first electrolyte 31 and the second electrolyte 32 and fired, and then the voids in the porous body are filled with the precursor solution of the third electrolyte 33 and fired at a temperature of less than the melting point of the third electrolyte 33. That is a method of compounding the active material layer 2 and the solid electrolyte layer 3X of the second embodiment illustrated in FIG. 4 by applying each precursor solution sequentially to the active material layer 2 of the lithium ion battery 10 as illustrated in FIG. 1, followed by drying and firing the applied precursor solution.

<Using Wet Method and Dry Method in Combination>

As a material, the porous body obtained by firing the active material particle, the precursor solutions of the first electrolyte 31 and the second electrolyte 32, and the powders of the third electrolyte 33 are prepared. The voids in the porous body formed of the active material particle are filled with the precursor solutions of the first electrolyte 31 and the second electrolyte 32 and fired, and then a melt obtained by melting the third electrolyte 33 is impregnated and quenched. That is a method compounding the active material layer 2 and the solid electrolyte layer 3X of the second embodiment illustrated in FIG. 4 by impregnating the melt of the third electrolyte 33 into the fired body obtained by applying each precursor solution to the active material layer 2 of the lithium ion battery 10 as illustrated in FIG. 1, followed by drying and firing the applied precursor solution.

In the above-described solid phase method, if the third electrolyte 33 is not added, it is possible to obtain an active material mixture in which the active material layer 2 and the solid electrolyte layer 3 of the first embodiment are compounded. In addition, in the wet method, if the third electrolyte 33 as a material is not prepared, it is possible to compound the active material layer 2 and the solid electrolyte layer 3 of the first embodiment.

Next, effects of the solid electrolyte will be specifically described with reference to examples and comparative examples.

1. Preparation Example of Metal Compound Solution

<1 mol/kg, Preparing of Butanol Solution of Lithium Nitrate>

1.3789 g of lithium nitrate as a metal compound which is a lithium source and 18.6211 g of butanol were weighed in a reagent bottle containing a magnetic stir bar and stirred with a magnetic stirrer at room temperature for 30 minutes, and lithium nitrate was completely dissolved so as to obtain a butanol solution of lithium nitrate at a concentration of 1 mol/kg.

<1 mol/kg, Preparing of 2-n-butoxyethanol Solution of Lanthanum Nitrate.6-hydrate>

8.6608 g of lanthanum nitrate as a metal compound which is a lanthanum source and 11.3392 g of 2-butoxyethanol were weighed in a reagent bottle containing a magnetic stir bar and stirred with a magnetic stirrer with a hot plate function at 140° C. for 30 minutes, and lanthanum nitrate.6-hydrate was completely dissolved and gradually cooled to room temperature so as to obtain a 2-n-butoxyethanol solution of lanthanum nitrate.6-hydrate at a concentration of 1 mol/kg.

<1 mol/kg, Preparing of Butanol Solution of zirconium-n-butoxide>

3.8368 g of zirconium-n-butoxide as a metal compound which is a zirconium source, and 6.1632 g of butanol were weighed in a reagent bottle containing a magnetic stir bar and stirred with a magnetic stirrer at room temperature for 30 minutes so as to obtain a butanol solution of zirconium-n-butoxide at a concentration of 1 mol/kg.

<1 mol/kg, Preparing of 2-n-butoxyethanol Solution of Niobium Pentaethoxide>

3.1821 g of niobium pentaethoxide as a metal compound which is a niobium source and 6.8179 g of 2-n-butoxyethanol were weighed in a reagent bottle containing a magnetic stir bar, and stirred with a magnetic stirrer at room temperature for 30 minutes so as to obtain a 2-butoxyethanol solution of niobium pentaethoxide at a concentration of 1 mol/kg.

<1 mol/kg, Preparing of 2-n-butoxyethanol Solution of Antimony tri-n-butoxide>

3.4110 g of antimony tri-n-butoxide as a metal compound which is an antimony source and 6.5890 g of 2-n-butoxyethanol were weighed in a reagent bottle containing a magnetic stir bar, and stirred with a magnetic stirrer at room temperature for 30 minutes so as to obtain a 2-butoxyethanol solution of antimony tri-n-butoxide at a concentration of 1 mol/kg.

<1 mol/kg, Preparing of 2-n-butoxyethanol Solution of Tantalum penta-n-butoxide>

5.4640 g of tantalum penta-n-butoxide as a metal compound which is an tantalum source and 4.5360 g of 2-n-butoxyethanol were weighed in a reagent bottle containing a magnetic stir bar, and stirred with a magnetic stirrer at room temperature for 30 minutes so as to obtain a 2-butoxyethanol solution of tantalum penta-n-butoxide at a concentration of 1 mol/kg.

2. Preparation Example of Solid Electrolyte Precursor Solution

Example 1

In Example 1, a $Li_{6.75}La_3Zr_{1.75}Nb_{0.25}Ta_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg, 0.2500 g of 2-n-butoxyethanol solution of niobium pentaethoxide at a concentration of 1 mol/kg, and 0.2500 g of 2-n-butoxyethanol solution of tantalum penta-n-butoxide at a concentration of 1 mol/kg where weighed, and stirred with a magnetic stirrer at room temperature for 30 minutes so as to obtain a $Li_{6.75}La_3Zr_{1.75}Nb_{0.2}Ta_{0.255}O_{12}$ precursor solution.

Example 2

In Example 2, a $Li_{6.75}La_3Zr_{1.75}Nb_{0.25}Sb_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg, 0.2500 g of 2-n-butoxyethanol solution of niobium pentaethoxide at a concentration of 1 mol/kg, and 0.2500 g of 2-n-butoxyethanol solution of antimony tri-n-butoxide at a concentration of 1 mol/kg were weighed, and stirred with a magnetic stirrer at room temperature for 30 minutes so as to obtain a $Li_{6.75}La_3Zr_{1.75}Nb_{0.25}Sb_{0.25}O_{12}$ precursor solution.

Example 3

In Example 3, a $Li_{6.75}La_3Zr_{1.75}Ta_{0.25}Sb_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg, 0.2500 g of 2-n-butoxyethanol solution of tantalum penta-n-butoxide at a concentration of 1 mol/kg, and 0.2500 g of 2-n-butoxyethanol solution of antimony tri-n-butoxide at a concentration of 1 mol/kg where weighed, and stirred with a magnetic stirrer at room temperature for 30 minutes so as to obtain a $Li_{6.75}La_3Zr_{1.75}Ta_{0.25}Sb_{0.25}O_{12}$ precursor solution.

Example 4

In Example 4, a $Li_{6.75}La_3Zr_{1.75}Nb_{0.25}Ta_{0.25}Sb_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg, 0.2500 g of 2-n-butoxyethanol solution of niobium pentaethoxide at a concentration of 1 mol/kg, 0.2500 g of 2-n-butoxyethanol solution of tantalum penta-n-butoxide at a concentration of 1 mol/kg where weighed, and 0.2500 g of 2-n-butoxyethanol solution of antimony tri-n-butoxide at a concentration of 1 mol/kg where weighed, and stirred with a magnetic stirrer at room temperature for 30 minutes so as to obtain a $Li_{6.75}La_3Zr_{1.75}Nb_{0.25}Ta_{0.25}Sb_{0.25}O_{12}$ precursor solution.

Comparative Example 1

In Comparative Example 1, a $Li_{6.75}La_3Zr_{1.75}Nb_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg were weighed, and 0.2500 g of 2-n-butoxyethanol solution of niobium pentaethoxide at a concentration of 1 mol/kg were weighed, and stirred with a magnetic stirrer at room temperature for 30 minutes so as to obtain a $Li_{6.75}La_3Zr_{1.75}Nb_{0.25}O_{12}$ precursor solution. That is, the solid electrolyte precursor solution of Comparative Example 1 only contains Nb among four kinds of metal elements (Nb, Ta, Sb, and Bi).

Comparative Example 2

In Comparative Example 2, a $Li_{6.75}La_3Zr_{1.75}Nb_{0.25}Si_{0.25}O_{12}$ precursor solution is prepared as a solid electrolyte precursor solution.

Among the above-described metal compound solutions, 6.7500 g of butanol solution of lithium nitrate at a concentration of 1 mol/kg, 3.0000 g of 2-n-butoxyethanol solution of lanthanum nitrate.6-hydrate at a concentration of 1 mol/kg, 1.7500 g of butanol solution of zirconium-n-butoxide at a concentration of 1 mol/kg, 0.2500 g of 2-n-butoxyethanol solution of niobium pentaethoxide at a concentration of 1 mol/kg, and 0.2500 g of 2-n-butoxyethanol solution of silicon pentaethoxide at a concentration of 1 mol/kg as a metal compound which is a silicon source were weighed, and stirred with a magnetic stirrer at room temperature for 30 minutes so as to obtain a $Li_{6.75}La_3Zr_{1.75}Nb_{0.25}Si_{0.25}O_{12}$ precursor solution. That is, in the solid electrolyte precursor solution of Comparative Example 2, Nb in period 5 among the group 5 elements and Si in period 3 among the group 14 elements are contained as a metal element. Note that, an atomic crystal radius of Si is 40 pm.

3. Synthesizing and Firing Solid Electrolyte

A titanium petri dish having an inner diameter of φ50 mm and a height of 20 mm was prepared and each of the solid electrolyte precursor solutions of Examples 1 to 4 and Comparative Examples 1 and 2 was put into the titanium petri dish and the titanium petri dish is placed on a hot plate. A temperature of the hot plate is set to be 180° C., and the solvent is dried for 60 minutes. Subsequently, the temperature of the hot plate is set to be 360° C., and most organic components are fired and decomposed for 30 minutes. Finally, the temperature of the hot plate was set to be 540° C., and preliminary firing was performed to fire and decompose residual organic components for 60 minutes. The hot plate is slowly cooled to room temperature while the titanium petri dish having the obtained preliminarily fired body is placed on the hot plate. In addition, each preliminarily fired body is extracted and moved to the agate mortar to be ground and pulverized.

0.2000 g of the pulverized preliminarily fired body is weighed, is put into a die of φ 10 mm (tablet former), and is subjected to uniaxial pressing at 50 kgN using a handy press machine so as to prepare a preliminarily fired body pellet.

The preliminarily fired body pellet of Examples 1 to 4 and Comparative Examples 1 and 2 was placed in a crucible made of magnesium oxide and covered with a lid made of magnesium oxide from above, and then the crucible is put into an electric muffle furnace to perform firing at 900° C. for 12 hours (main firing). After slowly cooling to room temperature, the crucible made of magnesium oxide is extracted from the electric muffle furnace. The solid electrolyte pellet of Examples 1 to 4, and Comparative Examples 1 and 2, which is subjected to the main firing, is extracted from the crucible made of magnesium oxide.

Example 5

In Example 5, the solid electrolyte precursor solution of Example 1 is set as a starting material, and the solid electrolyte pellet which is fired at 900° C. for 12 hours is pulverized in an agate mortar so as to obtain a particulate electrolyte having a median diameter after pulverization of approximately 6.2 μm. 0.1500 g of the particulate electrolyte is weighed, and 0.0500 g of $Li_3BO_3$ (three lithium borate) powder is added thereto. A median diameter of the $Li_3BO_3$ (three lithium borate) powder is approximately 6.0 μm. These powders are moved to an agate mortar, 0.2 ml of hexane is added to the agate mortar, and the powders and added hexane are mixed thoroughly until hexane is completely volatilized. The mixed powder is put into a die of φ 10 mm (tablet former), and is subjected to uniaxial pressing at 50 kgN using a handy press machine so as to make the mixed powder in a pellet form again. The pellet was placed on a pure gold dish having φ 13 mm, is put into an electric muffle furnace preheated to 800° C., is subjected to a heat treatment for 10 minutes, and rapidly cooled so as to obtain a solid electrolyte pellet of Example 5.

4. Evaluation of Solid Electrolyte Pellet of Examples 1 to 5 and Comparative Examples 1 and 2

The diameter and thickness of each solid electrolyte pellet after main firing (900° C. for 12 hours) were measured with a digital caliper (CD 67-S15 PS manufactured by Mitutoyo Corporation.) Also, the weight was measured in unit of 0.1 mg by using analytical balance (ME204T manufactured by Mettler Toledo International Inc.) From these values, the bulk density was determined.

In addition, each solid electrolyte pallet was measured by using an X-ray diffractometer (MRD manufactured by Koninklijke Philips N.V.) so as to confirm a crystal phase.

Further, impedance was measured by the AC impedance method using an impedance measuring device (1260 manufactured by Solartron Metrology), and the bulk, grain boundary, and total lithium ionic conductivity of the solid electrolyte which is a product were determined. Specifically, first, gold (Au) having a diameter of φ 8 mm was vapor-deposited on the front and back surfaces of the pellet of the solid electrolyte by sputtering so as to prepare a deactivated electrode, and the AC impedance was measured. Subsequently, the AC impedance at the activation electrode was measured by pressing a lithium metal foil against both front and back surfaces of the solid electrolyte pellet on a sputtered gold (Au) electrode.

5. Evaluation Results

Figure 7:
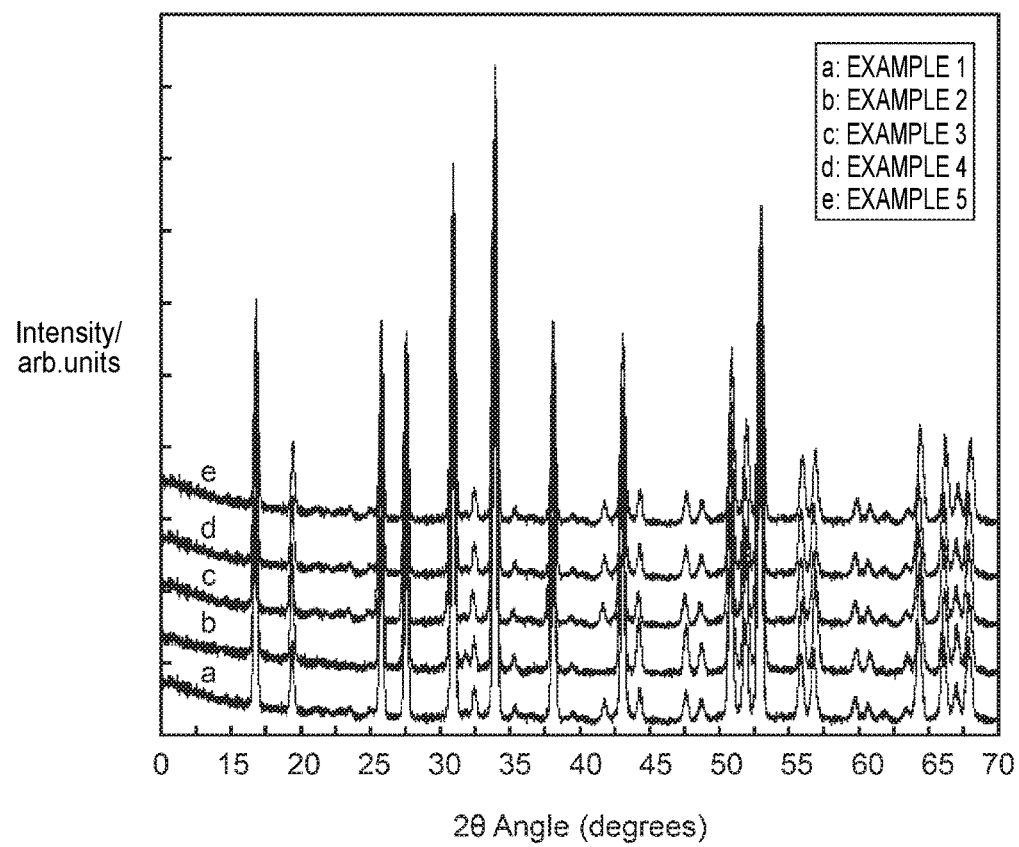
FIG. 7 is a graph illustrating measurement results of X-ray diffraction intensity of Examples 1 to 5.
Figure 8:
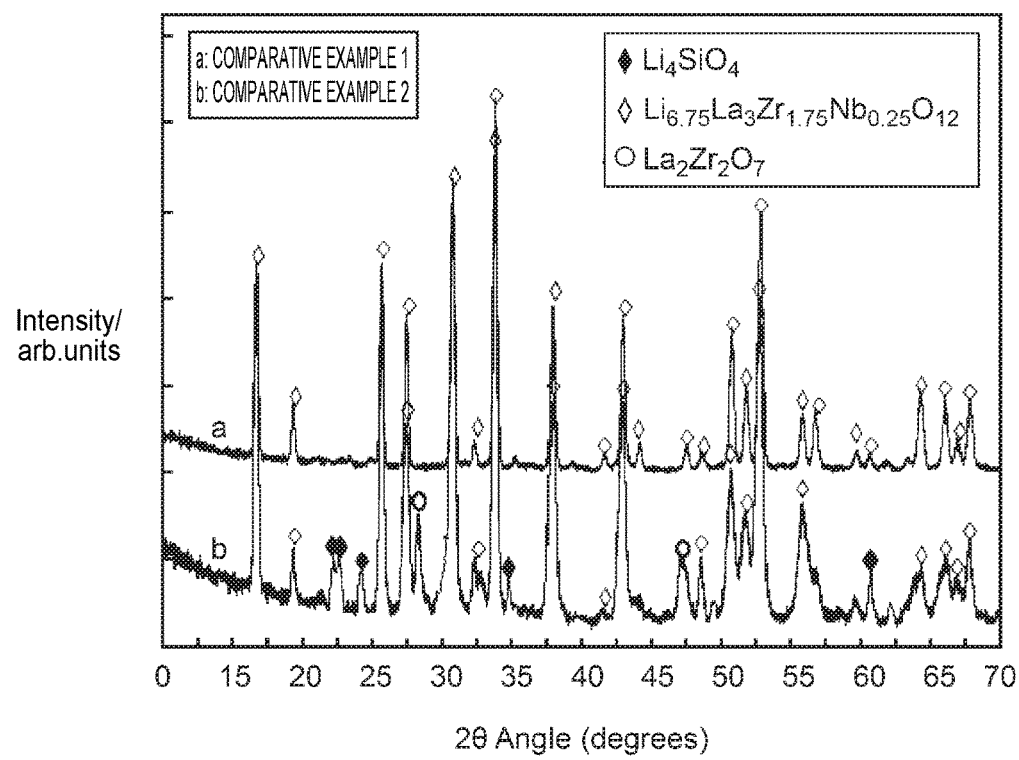
FIG. 8 is a graph illustrating measurement results of X-ray diffraction intensity of Comparative Examples 1 and 2.

FIG. 7 is a graph illustrating measurement results of X-ray diffraction intensity of Example 1 to Example 5, and FIG. 8 is a graph illustrating measurement results of X-ray diffraction intensity of Comparative Examples 1 and 2, FIG. 9 is a table indicating analysis results of the solid electrolyte of Examples 1 to 5 and Comparative Examples 1 and 2 by X-ray diffraction. Note that, in FIG. 7, reference symbols a to e attached to the graph indicate graphs corresponding to Examples 1 to 5. Similarly, in FIG. 8, reference symbol a attached to the graph indicates a graph corresponding to Comparative Example 1, and reference symbol b indicates a graph corresponding to Comparative Example 2.

As illustrated in FIGS. 7 and 8, from solid electrolyte of Examples 1 to 5 and Comparative Example 1, only diffraction peaks of lithium lanthanum zirconate were observed. In addition, diffraction peaks of lithium lanthanum zirconate containing metal element selected from among Nb, Ta and Sb and doped are not observed. No diffraction peaks related to contaminating phases indicating generation of contaminant are observed. The doped metal element is considered to be mainly contained in the second amorphous electrolyte 32.

On the other hand, as illustrated in FIG. 8, from the solid electrolyte of Comparative Example 2 to which silicon having an atomic crystal radius of 78 pm or less was added, not only the diffraction peak of lithium lanthanum zirconate, but also $La_2Zr_2O_7$ which indicates that lithium was removed from the garnet-type crystal structure were observed. In addition, a diffraction peak of $Li_4SiO_4$ which is a compound with silicon was observed. It is suggested that Si which is a metal element of which an atomic crystal radius is less than 78 pm is not substituted with the 48 g site in the garnet-type crystal structure and crystal precipitates at the grain boundary so as to deprive lithium from the garnet-type crystal structure, thereby forming double oxide.

That is, as illustrated in FIG. 9, the solid electrolyte of Examples 1 to 5 and Comparative Example 1 both contain garnet-type or garnet-like type lithium lanthanum zirconate, and has no contaminating phase. Although a main phase of the solid electrolyte of Comparative Example 2 contains garnet-type or garnet-like type lithium lanthanum zirconate, it has crystals of lithium-free double oxide. Further, it also has a contaminating phase including double oxide of silicon.

FIG. 10 is a table indicating a measurement result and a bulk density of lithium ionic conductivity in the solid electrolyte pellet of Examples 1 to 5, and Comparative Examples 1 and 2.

As illustrated in FIG. 10, the lithium ionic conductivity (S/cm) of the bulk in Examples 1 to 5 is $10^{-4}$ order or $10^{-5}$ order, and is not inferior even compared with Comparative Examples 1 and 2. On the other hand, the lithium ionic conductivity (S/cm) of the grain boundary in Examples 1 to 4 is $10^{-4}$ order, and is $10^{-3}$ order in Example 5. In contrast, the lithium ionic conductivity (S/cm) of the grain boundary in Comparative Examples 1 and 2 is $10^{-5}$ order or $10^{-6}$ order. Accordingly, the total lithium ionic conductivity (S/cm) of Examples 1 to 5 is $10^{-4}$ order or $10^{-3}$ order; wherein the total lithium ionic conductivity (S/cm) of Comparative Examples 1 and 2 is $10^{-3}$ order to $10^{-6}$ order. That is, in Examples 1 to 5, the lithium ionic conductivity (S/cm) at a grain boundary is improved and thus the total lithium ionic conductivity is more improved than that of Comparative Examples 1 and 2.

In Examples 1 to 5, among the doped Nb, Ta, and Sb, the metal elements substituted with 48 g site in the garnet-type or garnet-like type crystal structure all have the effect of promoting the formation of cubic crystals. It is considered that when the metal elements which contribute to the expression of bulk ionic conductivity and compete with each other at the same site, a concentration gradient of the metal element is generated between the first electrolyte 31 and the second electrolyte 32, which contributes to a decrease in the grain boundary resistance in the composite of the first electrolyte and the second electrolyte 32. In Example 5, it is considered that a composite particle of the first electrolyte 31 and the second electrolyte 32 is dispersed by adding the third electrolyte 33, the resistance occurring at the particle interface becomes extremely small and the total ionic conductivity is improved.

The solid electrolyte of Comparative Example 2 is doped with Si having an atomic crystal radius of less than 78 pm, Si having an atomic crystal radius of 40 pm is not substituted with the 48 g site in the garnet-type crystal structure but lithium is taken from the garnet-type crystal structure so as to form a double oxide, and thus the grain boundary resistance is increased and the ionic conductivity of the grain boundary is decreased as compared with Comparative Example 1.

In addition, the bulk density in the solid electrolyte pellet of Comparative Examples 1 and 2 is less than 50%; whereas, the bulk density in the solid electrolyte pellet of Examples 1 to 4 is approximately 70% to 78%. Further, the bulk density of the solid electrolyte pellet of Example 5 with which the third electrolyte 33 is filled is approximately 98%. That is, it is presumed that the first electrolyte 31 which is crystalline of Examples 1 to 4 is more effectively used than in Comparative Examples 1 and 2, and the first electrolyte 31 of Example 5 is still more effectively used.

The invention is not limited to the above-described embodiments, and can be appropriately changed within a scope not contrary to the gist or idea of the invention which can be read from the claims and the entire specification, and the solid electrolyte accompanying such change and the lithium ion battery to which the solid electrolyte is applied are included in the technical scope of the invention.

Modification Example 1

The metal element selected from group 5 elements in period 5 or higher or group 15 elements in the period 5 or higher is not limited to two or three kinds selected from Nb, Ta, Sb, and Bi, and four kinds thereof may be used.

The entire disclosure of Japanese Patent Application No. 2016-054951, filed Mar. 18, 2016 is expressly incorporated by reference herein.

REFERENCE SIGNS LIST

1 . . . CURRENT COLLECTOR
2 . . . ACTIVE MATERIAL LAYER
3, 3X . . . SOLID ELECTROLYTE LAYER
4 . . . ELECTRODE
10 . . . LITHIUM ION BATTERY
31 . . . FIRST ELECTROLYTE
32 . . . SECOND ELECTROLYTE
33 . . . THIRD ELECTROLYTE

The invention claimed is:

1. A solid electrolyte comprising:
a first electrolyte which contains a lithium composite metal compound containing Li, La, and Zr; and
a second electrolyte which contains Li, Sb and at least one kind of metal element selected from group 5 elements in period 5 or higher or group 15 elements in period 5 or higher,
wherein an atomic crystal radius of the metal element is 78 pm or more.

2. The solid electrolyte according to claim 1, wherein the at least one kind of the metal element is selected from Nb, Ta, and Bi.

3. The solid electrolyte according to claim 1, wherein the at least one kind of the metal element is two kinds of metal elements selected from Nb, Ta, and Bi.

4. The solid electrolyte according to claim 1, further comprising:
a third electrolyte which is amorphous and is formed of an oxide containing Li and B.

5. A lithium ion battery comprising:
a solid electrolyte layer formed of the solid electrolyte according to claim 1;
an electrode provided on one surface of the solid electrolyte layer; and
a current collector provided on a side of the solid electrolyte layer opposite to the one surface of the solid electrolyte layer.

6. The lithium ion battery according to claim 5,
wherein the electrode is formed of metallic lithium, and
wherein a positive electrode active material layer containing Li is provided between the other surface of the solid electrolyte layer and the current collector.

* * * * *